United States Patent [19]
Roberts

[11] 3,788,552
[45] Jan. 29, 1974

[54] SPRINKLER UNIT
[76] Inventor: James C. Roberts, 530 Broadway, Escondido, Calif. 92101
[22] Filed: Apr. 6, 1973
[21] Appl. No.: 348,761

[52] U.S. Cl. .......................... 239/276, 239/DIG. 1
[51] Int. Cl. ........................................... A62c 31/22
[58] Field of Search 239/276, 279, 285, 275, DIG. 1, 239/271, 277, 280

[56] References Cited
UNITED STATES PATENTS
| | | | |
|---|---|---|---|
| 2,108,207 | 2/1938 | Parker | 239/276 |
| 2,196,456 | 4/1940 | Charroin | 239/276 |
| 2,535,723 | 12/1950 | Coombs | 239/276 X |
| 3,638,863 | 2/1972 | Roberts | 239/276 |
| 3,750,956 | 8/1973 | Mastman | 239/276 |
| 3,606,167 | 6/1969 | Chapin | 239/280 |

Primary Examiner—Lloyd L. King

[57] ABSTRACT

A sprinkler unit having a tubular portion supported in the ground for passing a water supply conduit from the ground to a sprinkler cap to direct water against an inverted platform on the cap that is open to one side.

4 Claims, 7 Drawing Figures

PATENTED JAN 29 1974
3,788,552
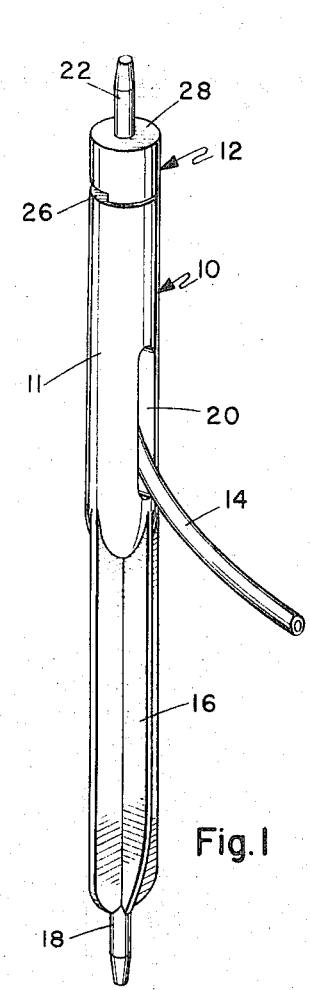
Fig. 1
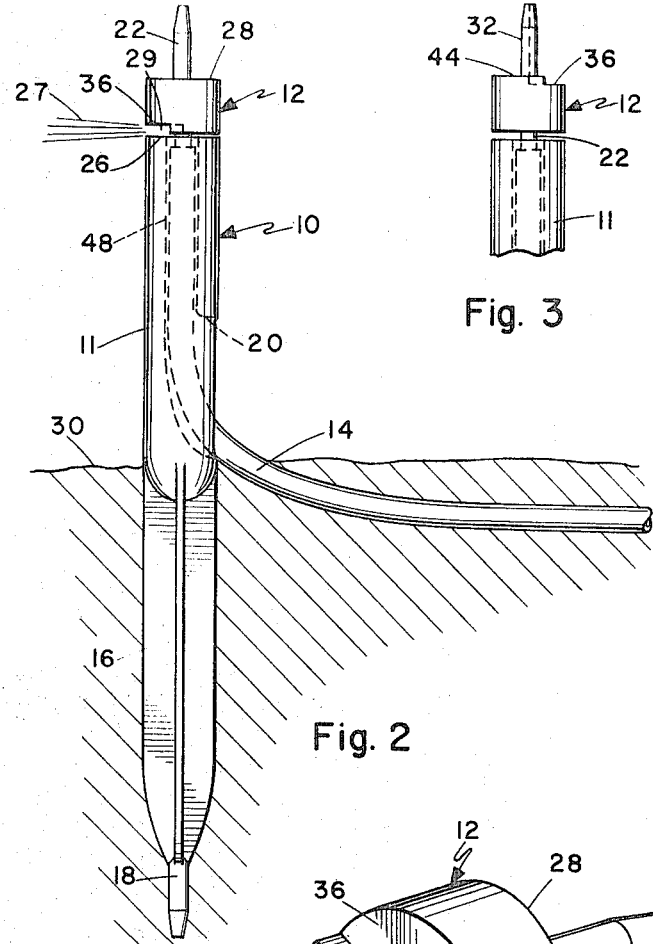
Fig. 2
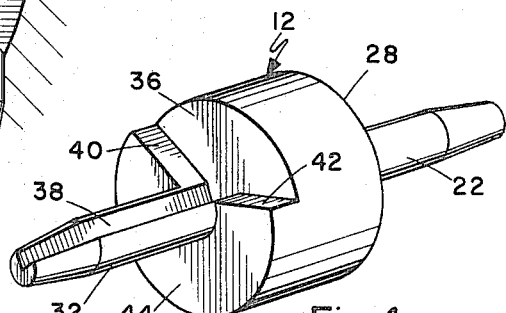
Fig. 3
Fig. 4
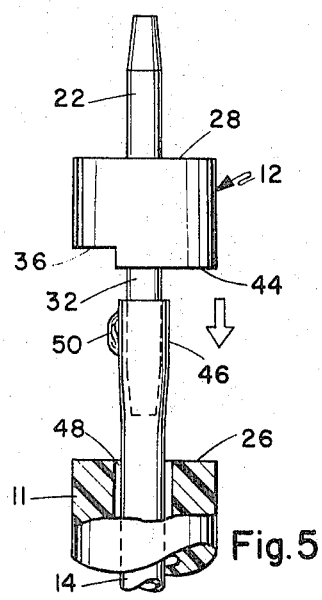
Fig. 5
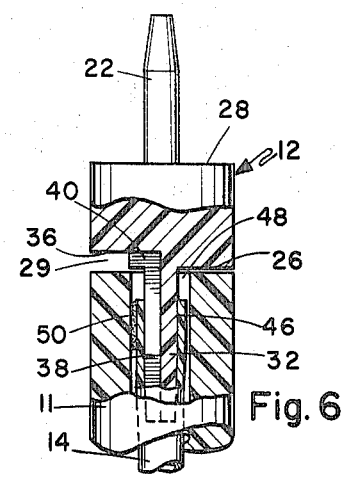
Fig. 6
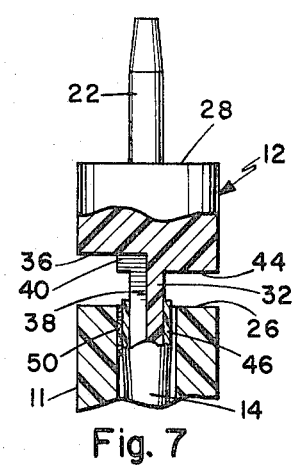
Fig. 7

SPRINKLER UNIT

BACKGROUND OF THE INVENTION

The generally accepted and used lawn type sprinkler systems normally have underground laid pipes and permanently positioned sprinkler installations. These systems are widely used for watering lawns, trees, flower beds and the like. However such systems while being reliable and permanent, are inflexible and expensive. Such systems cannot be moved or altered to accommodate changes in the landscaping of a yard or the like. Further such permanent systems present problems, where used with agricultural develop-ments, because of their inflexibility in being able to be moved without great difficulty and expense. While other sprinkler systems are entirely positioned above the ground, the systems are normally only acceptable for use in agriculture because of the water conduits being above ground.

So it is advantageous to have a sprinkler unit or system that can be easily and quickly arranged with buried water conduits to provide selective sprinkling in given areas, and which can be quickly and easily altered as to direction of spraying and with only slight difficulty in moving the entire buried conduits to re-establish the entire system, with sprinklers and conduits that are inexpensive and easy to use and control.

SUMMARY OF THE INVENTION

In an illustrative embodiment of the sprinkler unit, an elongated ground penetrating stem has an upper tubular portion with an open end and a slotted opening in one side. A water supply conduit is passed through the side opening and through the tubular portion with the end of the conduit being adjacent the upper open end. A cap member that has an end surface with a plug projecting longitudinally therefrom, has a platform that extends to one side. The plug has a water channel along its length that carries water to the platform. The plug, when inserted into the end of the conduit, directs water against the platform that is sprayed laterally to the side of the elongated ground penetrating stem. The plug is frictionally held by the conduit, yet it is easily and quickly removable. The opposite end of the cap has a second plug projecting longitudinally therefrom that does not have a channel. So the cap member and channel plug may be removed from the end of the conduit and the second plug inserted into the conduit, sealing off water flow.

It may be recognized that installation of the sprinkler unit is easily and quickly accomplished and may be easily and quickly changed. The midway slotted opening of the tubular portion is normally positioned adjacent to the ground so that the water conduit, that has a relatively small diameter, passes through the ground and into the slotted opening at about ground level. Thus the tubing is removed from view. The tubing is so small in diameter that it may be easily and quickly buried under the ground without great difficulty.

It is therefore an object of this invention to provide a new and improved sprinkler unit.

It is another object of this invention to provide a new and improved sprinkler unit that allows the water to be supplied through a flexible tubing that is passed up through the ground to the sprinkler, and the location of such system can be quickly and easily changed.

Other objects and many advantages of this invention will become more apparent upon a reading of the following detailed description and an examination of the drawing, wherein like reference numerals designate like parts throughout and in which:

FIG. 1 is a perspective view of a sprinkler unit.

FIG. 2 is a side elevation view of the sprinkler unit set in the ground.

FIG. 3 is a view similar to a portion of FIG. 2, with the cap inverted to plug the conduit.

FIG. 4 is an enlarged perspective view of the cap portion.

FIG. 5 is an enlarged side elevational view, partly cut away, illustrating the assembly of the unit.

FIG. 6 is a similar view with the cap set in place, flush with the body.

FIG. 7 is a further similar view with the head set in spaced position from the body.

Referring now to the drawing, a sprinkler unit 10 has an elongated ground penetrating stem that comprises an upper tubular portion 11 supported by a lower stem portion 16 that has cruciform ribs used for stength only, the exact configuration of the stem not being critical. The lower end of the ribs 16 terminate into a ground penetrating end plug 18. The tubular portion 11 has an internal passage 48 that extends from a first opening at its upper end 26 to a slotted side opening 20. This provides a passage for a water conducting conduit 14, and end 46 of which is normally positioned in the passage 48 adjacent the end 26 of the tubular portion 11. The water conducting conduit 14 is normally of small diameter, i.e., spaghetti type, that is easily and quickly placed under the surface of the ground with one end being connected as illustrated and with the other end, not shown, being connected to a water supply, such as though a manifold or the like.

A cap member 12 has a cylindrical shape with an end plug 32 projecting longitudinally therefrom. The remainder of the end surface of the cap member comprises a platform 36 opening to one side and a surface 44. The platform has sidewalls 40 and 42 that diverge from a channel or groove 38 in the plug member 32. The other surface 44 is also flat and can abut, as will be described in more detail hereinafter, against the end surface 26 of the tubular portion 11.

In operation, the stem is inserted into the ground, see FIG. 2, with the water conducting conduit 14 passing from the ground through opening 20 into the passage 48. The channeled plug 32 is inserted into the end of conduit 14 and water is then passed through conduit 14 and through channel 38, impacting against the platform 36 and spraying in a spray 27. The cap member 12 is normally positioned very close to or abutting against the end surface 26 of the tubular member providing a space 29 for controlling the spray 27. When it is no longer desired to spray water, then the cap member 12 is inverted and plug 22 is inserted into the conduit 14, shutting off the water spray.

In positioning the stem member, it may be inserted into the ground to any desired depth so that slot 20 is at any level above the ground 30 or even below the ground. Normally the slot portion 20 would be entirely below the ground and thus the conduit 14 would not be seen. The cap member 12 may be adjustably positioned in spaced relationship above the end 26 of the tubular member 11. However the spacing must be kept at a minimum, otherwise the force of the water spraying from the platform 36 will cause the cap portion 12 to gyrate. While the end plug 32 normally expends the conduit 46 sufficiently to hold both in position in opening 48, the end of the conduit 46 can be fixed in place by applying cement or glue 50 to the end of the conduit 46 projected above the end 26, see FIG. 5. Then when the conduit 46 and plug 32 are pulled back into opening 48, the glue 50 fixes the conduit in position.

It may be recognized that the plug 12 may be rotated at any given time to any given spray direction from the sprinkler unit 10 by pulling the cap 12 and plug 32 from the end of the conduit 46 and rotating the cap member 12 to the desired spraying direction before reinserting plug 32 into the end 46 of the conduit 14.

Having described my invention, I now claim.

1. A sprinkler unit comprising, an elongated ground penetrating stem having an upper tubular portion with a first opening at the upper end of the tubular portion and a second opening in the side of the tubular portion adjacent the ground and mid-way the length of said stem, for passing a water carrying conduit extending from the ground through the tubular portion with the end of the conduit being adjacent the first opening, a cap member having an end surface with a platform opening to one side thereof and a plug projecting longitudinally therefrom, and the plug having a longitudinal water conducting groove terminating at the platform for insertion into the end of the conduit.

2. A sprinkler unit as claimed in claim 1 including, means for securing the plug into the end of the conduit, and the conduit being movable in the tubular portion to space the platform from the upper end of the tubular portion.

3. A sprinkler unit as claimed in claim 1 including, means for fixing the end of the conduit in a fixed position in said tubing, and said plug having a length that places the platform adjacent the upper end of the tubular portion.

4. A sprinkler unit as claimed in claim 3 wherein, th platform has sidewalls diverging from the groove, the end of the cap member adjacent the platform having a flat surface axially spaced from the platform the width of the sidewalls, and the flat surface substantially abutting the end of the tubular portion.

* * * * *

UNITED STATES PATENT OFFICE
CERTIFICATE OF CORRECTION

Patent No. 3,788,552  Dated January 29, 1974

Inventor(s) James C. Roberts

It is certified that error appears in the above-identified patent and that said Letters Patent are hereby corrected as shown below:

Cover page line 76, the Inventor's address should read James C. Roberts "530 Broadway, Escondido, Calif. 92101" should read --1860 Jeffrey Avenue, Escondido, Calif. 92025--.

Signed and sealed this 11th day of June 1974.

(SEAL)
Attest:

EDWARD M. FLETCHER, JR.
Attesting Officer

C. MARSHALL DANN
Commissioner of Patents